ically lock and releasably retain the catch in its closed or strike engaging position when the catch is moved to the latter position.

United States Patent
Swanson

[15] 3,670,371
[45] June 20, 1972

[54] CATCH WITH ANTI-RELEASE LATCH

[72] Inventor: Gunnar E. Swanson, Middletown, Conn.

[73] Assignee: The Nielsen Hardware Corporation, Hartford, Conn.

[22] Filed: Feb. 24, 1971

[21] Appl. No.: 118,552

Related U.S. Application Data

[63] Continuation of Ser. No. 790,130, Jan. 9, 1969, abandoned.

[52] U.S. Cl. ............................................................24/68 T
[51] Int. Cl. .............................................................A43c 11/00
[58] Field of Search..........292/248; 254/78; 24/68 T, 68 CD, 24/68 E

[56] References Cited

UNITED STATES PATENTS

| 1,091,344 | 3/1914 | Jenks | 24/68 T |
| 1,437,427 | 12/1922 | Langenau | 292/248 |
| 2,852,827 | 9/1958 | Arnold | 24/68 CD |
| 2,945,274 | 7/1960 | Paterson | 24/68 T |
| 3,271,007 | 9/1966 | Ratcliff | 254/78 |

FOREIGN PATENTS OR APPLICATIONS

| 1,114,621 | 5/1968 | Great Britain | 24/68 T |

Primary Examiner—Donald A. Griffin

[57] ABSTRACT

A catch for releasably connecting two separable parts and having a base adapted for attachment to one part and an operating lever operable to move a latch into engagement with a strike attached to the other part. A manually releasable resilient generally U-shaped locking element acts between the operating lever and another part of the catch to automatically lock and releasably retain the catch in its closed or strike engaging position when the catch is moved to the latter position.

22 Claims, 18 Drawing Figures

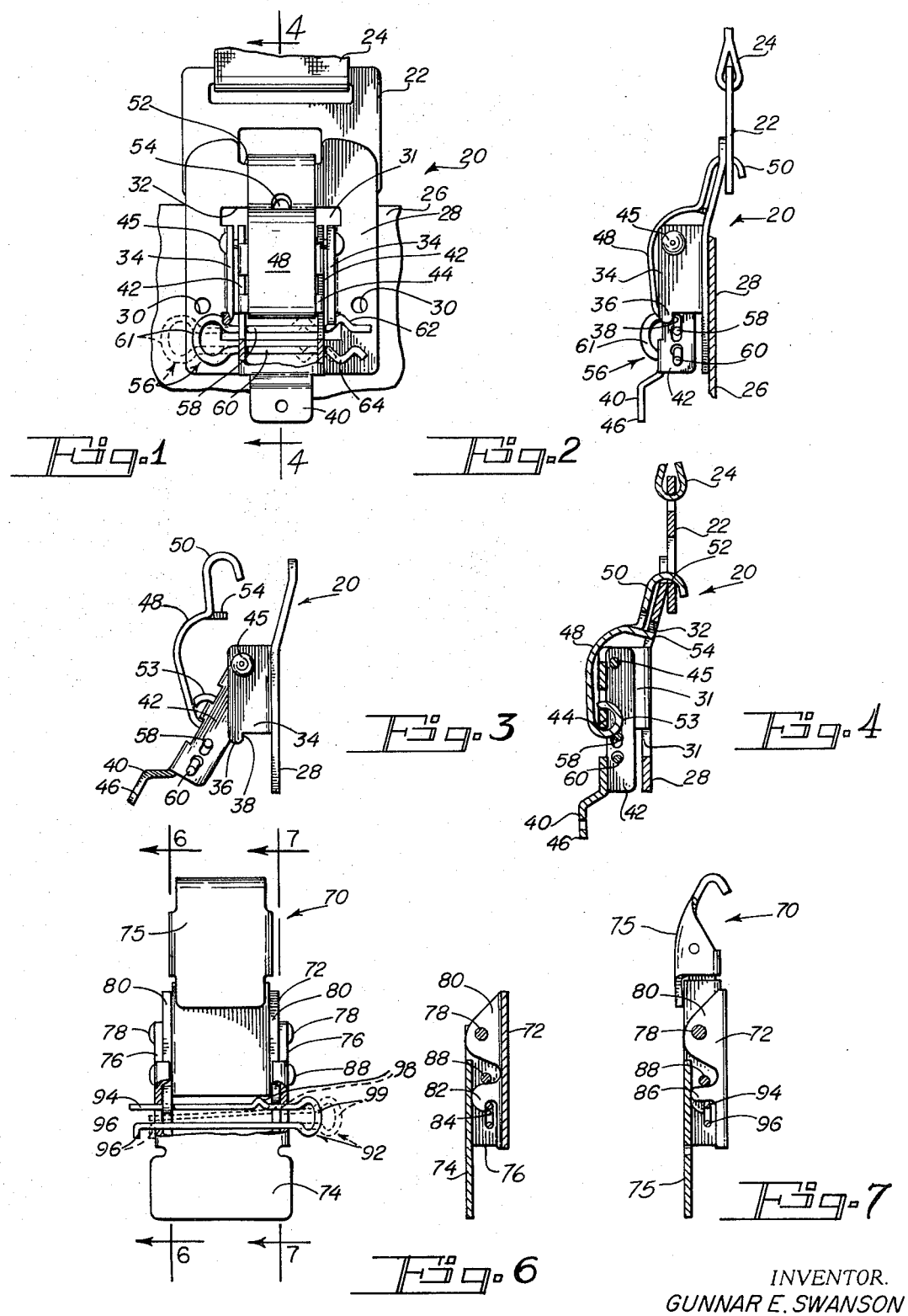

3,670,371

CATCH WITH ANTI-RELEASE LATCH

This application is a continuation of Ser. No. 790,130, filed Jan. 9, 1969, now abandoned.

BACKGROUND OF THE INVENTION

This invention relates to a catch for releasably connecting two separable parts such as the body and cover of a case or box. More particularly, the invention deals with a catch having a latch engageable with an associated strike, a pivoting operating lever operable to move the latch into engagement with the strike, and a locking element which acts between the operating lever and another part of the catch to retain the catch in its strike engaging position.

The general aim of the present invention is to provide an improved catch unit of relatively simple construction wherein the operating lever is releasably held in its closed position by an easily operated locking device which resists shock loads and vibration. A more specific aim of the invention is to provide a catch of the foregoing character which may be arranged to automatically lock in its closed position.

SUMMARY OF THE INVENTION

The invention resides in a catch having a base for attachment to a supporting part and a latch movable into and out of holding engagement with a strike on another part, a lever movable between closed and open positions for moving the latch into and out of engagement with the strike, and a locking element for holding the operating lever in its closed position so as to resist inadvertent or accidental opening of the catch. The locking element may be of such character as to provide a restraint between the operating lever and the base or between the operating lever and the latch.

BRIEF DESCRIPTION OF THE DRAWINGS

FIG. 1 is a front elevational view of a catch embodying the present invention and shown in its closed position.

FIG. 2 is a side view of the catch shown in FIG. 1 shown in its closed position.

FIG. 3 is similar to FIG. 2 but shows the catch in its open position.

FIG. 4 is a sectional view taken along the line 4—4 of FIG. 1.

FIG. 5 is a front elevational view of another catch embodying the present invention and shown in its closed position, a portion of the operating lever being shown broken away to revel the structure of other parts.

FIG. 6 is a sectional view taken along the line 6—6 of FIG. 5.

FIG. 7 is a sectional view taken along the line 7—7 of FIG. 5.

DETAILED DESCRIPTION OF THE PREFERRED EMBODIMENTS

Figure 8:
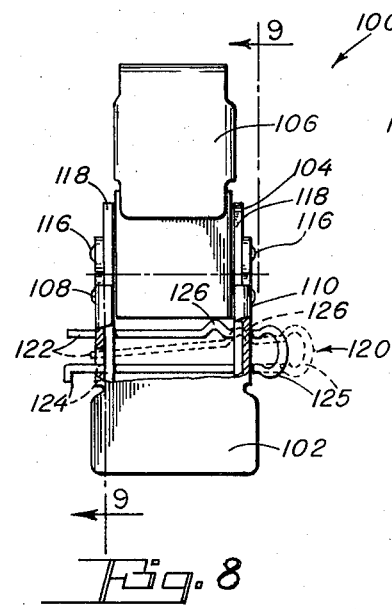
FIG. 8 is a front elevational view of still another catch embodying the present invention and shown in its closed position, a portion of the operating lever being shown broken away to reveal the structure of other parts.

Turning now to the drawings and referring first particularly to FIGS. 1-4, a catch embodying the present invention and indicated generally at 20 is adapted for use in cooperation with a strike 22 to releasably connect two separable parts 24 and 26. The catch 20 is particularly adapted for use as a fastener for the closure of a knapsack or the like, therefore, the parts 24 and 26 may, for example, respectively comprise parts of a knapsack body and closure.

The catch 20 includes a base 28, suitably adapted for attachment to the part 26 and which base includes openings 30, 30 for use in fixedly attaching the same to the part as with rivets or the like. The base 28 has a central opening 31 therethrough partially defined by an upper edge 32 and also includes a pair of transversely spaced and vertically extending side flanges 34, 34 which are bent forwardly from the central portion thereof. Each side flange 34 has a rounded ear 36 depending from its forward end which includes a rearwardly facing abutment surface 38. The catch 20 also includes an operating member or lever 40 connected with the base 28 for pivotal movement about a horizontal transverse axis fixed relative to the base. The lever 40 has two parallel side flanges 42, 42 connected by transverse webs and a cross member 44. The flanges 42, 42 extend generally parallel to the base when the lever is in its closed position as it appears in FIGS. 1, 2, and 4. The pivotal connection between the base and the operating lever is provided by a transversely aligned and horizontally extending pivot pin 45 which passes through apertures in the base flanges 34, 34 and through corresponding apertures in the lever flanges 42, 42. In the embodiment shown in FIGS. 1-4 the lever 40 has an extension 46 which serves as a finger piece for moving the lever and connected parts relative to the base. From the latter figures, it will also be noted that the lever flanges 42, 42 have a substantially greater length than the flanges 34, 34 of the base and that when the operating lever is in its closed position its side flanges 42, 42 are located closely adjacent to and between the flanges 34, 34 but extend for some distance therebelow.

A latch 48 is pivotally connected with the lever 40 and is engageable with the strike 22. Preferably and as shown the latch 48 is made from resilient flat metal and has generally U-shaped hook 50 at its upper end which defines a bearing surface for engaging an upwardly facing bearing surface 52 on the strikes, as best shown in FIG. 4. A loop 53 formed at the lower end of the latch 48 encircles the cross member 44 to provide pivotal connection between the lever 40 and the latch 48. A tab 54 struck from the latch 48 extends rearwardly into the central opening 31 in spaced relation to the surface 32 when the latch is in its closed position as shown in FIG. 4. When a sudden shock load is applied to the strike 22, the arcuately shaped latch 48 tends to straighten or elongate in the direction of the strike until the tab 54 engages the abutment surface 32. Thus, the tab 54 provides a means for resisting deformation of the latch 48 under shock load conditions or the like.

An important feature of the present invention resides in the generally U-shaped locking element or locking spring which releasably retains the latch in its closed position so that it will resist opening under shock loads or the influence of vibration. The locking element may take various forms and be supported to act between various parts of the catch. In the device illustrated in FIGS. 1-4, the locking element constitutes a resilient generally U-shaped hairpin-like locking pin indicated generally at 56 carried by the lever 40 and engageable with the base 28. The pin 56 is formed from spring wire and has two parallel legs 58 and 60 joined together by a generally U-shaped connecting portion 61 which has a width somewhat greater than the spacing between the two legs. The legs extend transversely through apertures in the lever flanges 42, 42 and are disposed below the base flanges 34, 34 when the lever 40 is in its closed position. The free ends of the legs 58 and 60 extend for some distance beyond the flanges 42 and 34 and have opposing crowned or generally V-shaped bent portions 62 and 64 respectively formed therein and spaced from the terminal ends thereof, as best shown in FIG. 1. The connecting portion 61 is bent forwardly from the plane of the legs to serve as a handle for slidably moving the locking pin 56 transversely of the operating lever 40 between locking and releasing positions respectively indicated by full and broken lines in FIG. 1, the apertures in the flanges 42, 42 being of sufficient diameter to permit this shifting movement. When the catch 20 is in its closed position and the locking element 56 is in its locking position, it will be noted that the bent portion 62 is engagable with an associated abutment surface 38, on one flange 34 and a portion of the connecting portion 61 is engagable with the abutment surface 38 on the other flange 34 to retain the catch 20 in its closed position. To open the catch 20 the pin 56 is moved to its releasing position in which position the bent portions 62 and 64 are disposed between the flanges 42, 42 so that horizontally extending portions of the upper leg 58 are disposed below the ears 36, 36. Thus, the lever 40 is free to pivot forwardly about its axis or in a clockwise direction as viewed in FIG. 3 free of interference from the ears 36, 36.

When the catch 20 is moved from its open to its closed position and the locking pin 56 in its locking position the catch 20 is automatically locked or releasably retained in its closed position. As the operating lever 40 is pivoted toward it closed position the crowned portion 62 and the connecting portion 61 each respectively engage one of the rounded ears 36, 36, which cam or deflect the upper leg 58 generally toward the lower leg 60 and away from its abutment engagable position so that the lever 40 may be pivoted to its fully closed position. When the lever 40 attains the latter position the connecting portion 61 biases the upper leg 58 to a position rearwardly of the ears 36, 36 and the abutment surfaces 38, 38 to releasable retain the catch 20 in its closed position. If desired, the catch 20 may be moved to its closed position with the locking pin 56 in its releasing position and thereafter be locked in closed position by manually moving the locking pin to its locking position.

With the exception of its locking element, each of the catches which illustrate further embodiments of the present invention are of generally conventional type and need not be described in full detail. FIGS. 5–7 show another catch construction which has a locking element or locking spring constructed differently from the corresponding element employed in the construction of FIGS. 1–4. The catch indicated generally at 70 has a base 72 and includes an operating lever 74 connected to the base for pivotal movement about a horizontal transverse axis fixed relative to the base and a latch 75 connected to the lever for movement into and out of engagement with a strike (not shown). The lever 74 is shown as having two parallel side flanges 76, 76 which extend generally parallel to the base when the lever is in its closed position, as shown. The pivotal connection between the base and the operating lever is provided by two transversely aligned and horizontally extending pivot pins 78, 78 which pass through apertures in the side flanges 76, 76 and through corresponding apertures in transversely spaced flanges 80, 80 bent forwardly from the base 72 and located closely adjacent and between the flanges 76, 76. A rounded hook 82 is bent forwardly from the left side of the base below the flange 80 as viewed in FIG. 5. The hook open downwardly and has a rearwardly facing abutment surface 84. A rounded tab 86 is bent outwardly from the base below the other flange 80 opposite the hook 82. When the lever 74 is in its closed position, as it appears in FIGS. 5–7, the side flanges thereof extend for a substantial distance below the hook 82 and the tab 86. The latch 75 comprises a composite line which has a hook formed at its upper end for engaging the strike and at its lower end is pivotally connected to the operating lever 74 by a horizontally disposed transversely extending pivot pin 88 which extends through the lower portion of the latch 75 and through apertures in the lever side flanges 76, 76.

The catch 70 includes a locking element of generally U-shaped locking pin indicated generally at 92 which is carried by the lever 74 and engageable with the base 72. Like the previously described locking pin 56 the pin 92 is bent from resilient wire and has a upper leg 94 and a lower leg 96 joined together by a U-shaped connecting portion 99 and which extend through apertures in the side flanges 76, 76. The upper leg 94 has an upwardly bent or crowned portion 98 disposed between the flanges 76, 76 and near the tab 86 and preferably having the shape of an inverted V, as shown. The terminal or free end portion of the lower leg 96 is turned downwardly and serves to prevent the pin from being dislodged from the lever 74 when it is shifted with respect to the lever from its locking or full line position to its releasing or broken line position as shown in FIG. 5. In locking position a portion of the upper leg 94 is disposed within the hook 82 and is engageable with the abutment surface 84 to retain the catch 70 in its closed position. When the locking pin is shifted to its releasing position the tab 86 cammingly engages the crowned portion 98 to move the latter portion to a position in engagement with the lower side of the tab so that the upper leg 94 is deflected generally toward the lower leg 96 and out of engagement with the hook 82. As the lever 74 is pivoted toward its open position the crowned portion 98 remains in engagement with the tab 86 until the upper leg 94 has moved to a position forwardly of the abutment surface 84. As the locking pin moves out of engagement with the tab 86 the upper leg is biased away from the lower leg 96 and an inclined part of the crowned portion 98 engages the flange 76 at the right side of the lever 74 to urge the pin 92 toward its locking position. When the lever 74 is again pivoted toward its closed position an inclined part of the crowned portion 98 engages the tab 86 to further urge the pin 92 toward its locking position. Thus, when the catch 70 is moved toward its closed position the rounded forward part of the hook 82 cammingly engages the upper leg 94 to move it into engagement with the hook and thereby automatically lock or releasably retain the catch 70 in its closed position.

Figure 9:
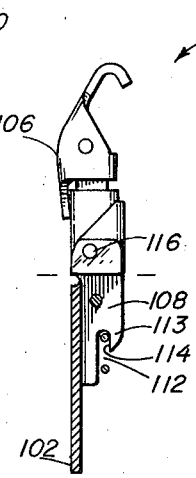
FIG. 9 is a sectional view taken along the line 9—9 of FIG. 8.
Figure 10:
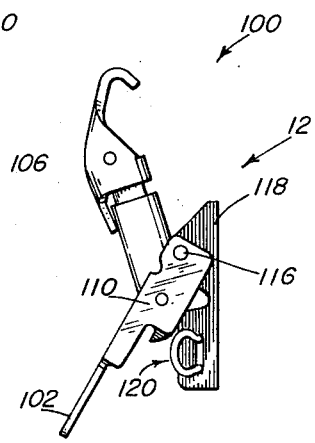
FIG. 10 is a side elevational view of the catch of FIG. 8 but shows the catch in its open position.

Still another catch embodying the invention and indicated generally at 100 is shown in FIGS. 8–10. The catch 100 is similar in many respects to the catch 70 previously described but differs therefrom in the manner in which its locking pin is supported and arranged. Specifically, the catch 100 includes an operating member or lever 102 pivotally supported on a base 104 and carrying a latch member 106. The lever has parallel side flanges 108 and 110. The flange 108 has a downwardly opening hook-like recess 112 formed therein which has a rounded part 113 and a forwardly facing abutment surface 114 best shown in FIG. 9. A pivotal connection between the base and the operating lever is provided by two transversely aligned and horizontally extending pivot pins 116, 116 which pass through apertures in the side flanges 108 and 110 and through corresponding apertures in transversely spaced flanges 118, 118 bent outwardly from the base 104. The catch 100 also includes a locking element or generally U-shaped locking pin indicated generally at 120 which is substantially identical to the pin 92 previously described, however, the locking spring or pin 120 is supported by the base 104 and engageable with the lever 102. The pin 120 has upper and lower legs respectively indicated at 122 and 124 joined together by a generally U-shaped connection portion 125. The legs 122 and 124 pass through vertically disposed slots in the flanges 118, 118. The upper leg 122 has an upwardly bent or crowned portion 126 formed thereon between the flanges 118, 118 and near the flange 110. The terminal end of the lower leg 124 is bent downwardly and the connecting portion 125 is bent forwardly to serve as a handle for shifting the pin 120 relative to the base 104 between a locking or full line position and a releasing or broken line position as shown in FIG. 8. When the catch 100 is in its closed position and the locking pin 120 is in its locking position the leg 122 resides within the recess 112 and is engageable with the abutment surface 114 to releasably retain the catch in its closed position. When the locking pin 120 is moved to its releasing position the right base flange 118 cammingly engages to deflect the leg 122 generally toward the leg 124 and out of the recess 112 so that the lever 102 may be pivoted to its open position as shown in FIG. 10. The downwardly bent terminal end of the leg 124 engages the left base flange 118 to arrest movement to the pin 120 when the pin attains its releasing position. When the lever 102 is pivoted toward its closed position with the pin 120 in its locking position the rounded portion 113 engages the upper leg 122 to cam it into engagement with the recess 112 and automatically lock the catch 100 in its closed position.

Figure 11:
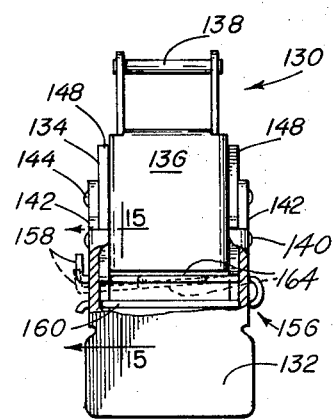
FIG. 11 is a front elevational view of yet another catch embodying the present invention, and shown in its closed position, a portion of the operating lever being shown broken away to reveal the structure of other parts.
Figure 12:
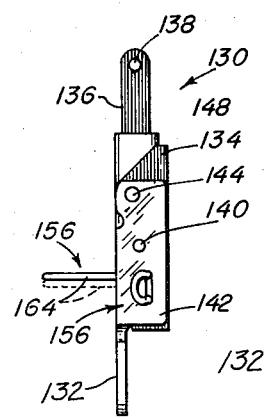
FIG. 12 is a side elevational view of the catch of FIG. 11, shown in its closed position.
Figures 13, 15:
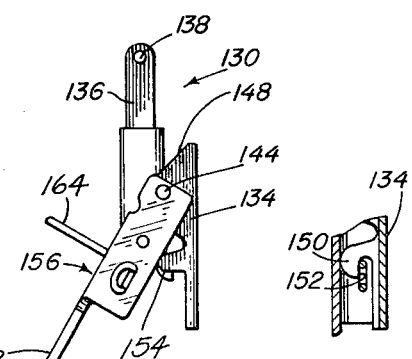
FIG. 13 is generally similar to FIG. 12 but shows the catch in its open position.
FIG. 15 is a fragmentary sectional view taken along the line 15—15 of FIG. 11.
Figure 14:
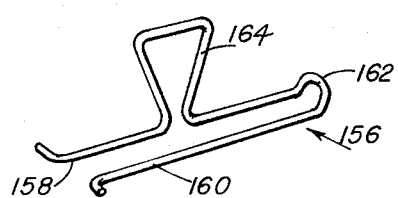
FIG. 14 is a perspective view of the locking element of the catch shown in FIG. 11.

Another catch embodying the present invention and indicated generally at 130 is shown in FIGS. 11–13. The catch 130 includes an operating member or lever 132 pivotally mounted on a base 134 and carrying a pivoted latch member 136 which comprises a composite link. At its upper end the link has a strike engaging bar 138. The lower end of the link is pivotally connected to the lever 132 by a transversely extending pivot pin 140 which passes through the lower end and through parallel side flanges of the lever 132 indicated at 142, 142. The lever is in turn pivoted on the base 134 by a pair of horizontally disposed transversely extending pivot pins 144, 144 which pass through apertures in the side flanges 142, 142 and through corresponding apertures in transversely spaced flanges 148, 148 bent forwardly from the base 134. A hook 150 bent forwardly from the base 134 below the left flanges 148 has a downwardly opening recess which includes an inwardly facing abutment surface 152. A tab 154 extends outwardly from the base below the other base flange 148.

The catch 130 includes a locking element of locking pin indicated generally at 156 carried by the lever 132 and engageable with the base 134. Like the previously described locking pins the locking spring or pin 156 has two legs 158 and 160 joined together by a generally U-shaped connecting portion 162. The leg 158 has a handle portion 164 formed therein which lies in a plane generally normal to the plane of the legs. The legs 158 and 160 extend through vertically disposed slots in the lever flanges 142, 142. The legs are bent outwardly in opposite directions at their respective terminal ends and the connecting portion 162 is bent forwardly to retain the pin 156 in assembly with the lever 132. The handle 164 projects forwardly beyond the lever 132 and provides a means for manually deflecting the upper leg or moving it from its locking or solid line position to its releasing or broken line position as shown in FIG. 11. The locking pin 156 is normally biased to its locking position thus when the lever 132 is pivoted toward its closed position the free end of the leg 158 engages the rounded portion of the hook 150 to deflect or cam the leg into engagement with the hook. When the lever 132 is in its closed position the leg 158 is engageable with the abutment surface 152 to releasably retain the catch 130 in its closed position. The catch may be released or opened by moving the handle 164 downwardly to deflect the leg to its releasing position.

Figure 16:
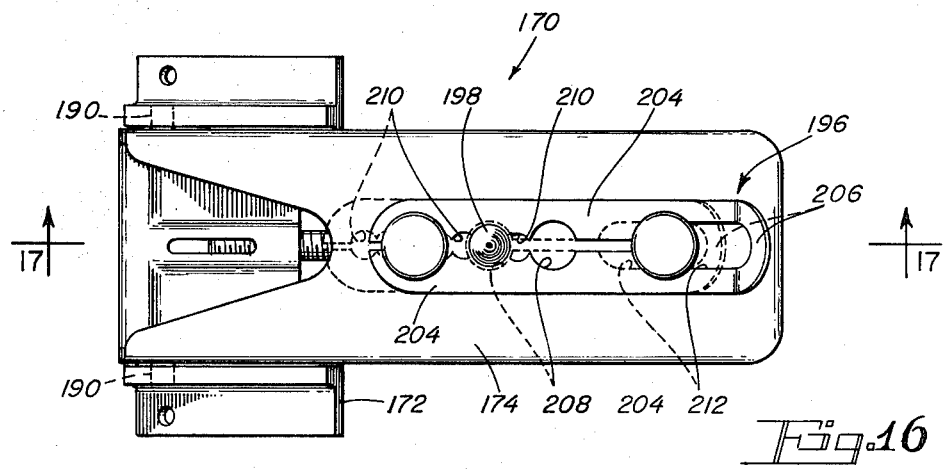
FIG. 16 is a front elevational view of still another catch embodying the present invention and shown in its closed position.
Figure 17:
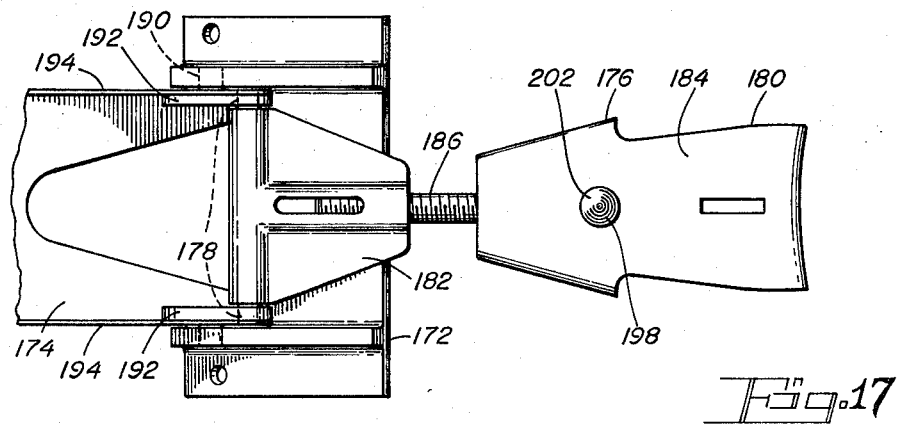
FIG. 17 is a fragmentary front elevational view of the catch of FIG. 14, but shows the catch in its open position.
Figure 18:
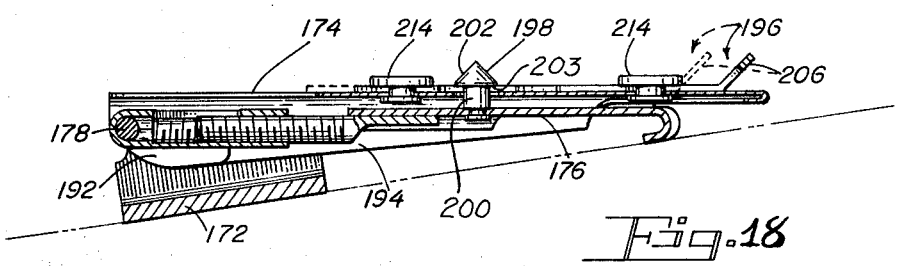
FIG. 18 is a sectional view taken generally along the line 17—17 of FIG. 16.

Considering now FIGS. 16–18 another catch embodying the present invention and indicated generally at 170 includes a base 172, suitably adapted for attachment to a part, and an operating lever 174. It further includes a latch member or draw bar 176 which is pivotally connected to one end of the operating lever 174 by a transversely extending pin 178 for engaging a strike (not shown). The draw bar is adjustable to length and is comprised basically of two parts. These two parts are a strike engageable claw 180 and an inner part 182. The claw 180 includes a wide upper part 184 preferably made of sheet metal and a threaded shank 186. The inner part 182 is preferable formed from sheet metal, as shown, and in addition to defining a transversely extending opening for receiving the pivot pin 178 also defines a longitudinally extending centrally arranged opening into which the shank 186 of the claw 180 is threaded.

The base 172 is adapted to rest flatly against the surface of a panel or part and may be secured thereto in any convenient manner, as for example by screws or rivets or the like. Two transversely spaced flanges 188, 188 extend forwardly from the portion of the base engaging the panel and include aligned openings which receive a pair of pivot pieces or trunnings 190, 190. Each pivot piece to trunnion 190 is in turn fixedly attached to an associated flat link 192 which is welded to an associated one of two transversely spaced and longitudinally extending side flanges 194, 194 on the operating lever 174.

As mentioned, the draw bar 176 is pivotally connected to the inner end of the operating lever 174 by the transversely extending pivot pin 178 which is pivotally received in openings extending through the operating lever side flanges 194, 194 and through two links 192, 192. As so constructed and arranged, the catch unit 170 can be closed and opened by movement of the operating lever 174 relative to the base 172 about the axis of the trunnions 190, 190. In the closed condition of the catch, the operating lever 174 overlies the draw bar 176 and the strike. That is, the free end of the operating lever faces in a direction away from the base 172 and toward the strike. In the open condition of the catch, the operating lever is displaced a substantial angular distance from the strike, as shown in FIG. 17.

The catch 170 also includes a generally U-shaped locking element or locking spring indicated generally at 196 carried by and extending longitudinally of the operating lever. The locking element is engageable with a locking stud 198 associated with the draw bar to releasably retain the catch 170 in its closed position when the draw bar is in engagement with an associated strike. The locking stud 198 is riveted or otherwise suitably secured to the claw 180 and projects forwardly therefrom and through a longitudinally elongated opening in the lever 174 when the lever is in its closed position. It has generally cylindrical shank portion 200 and an enlarged head 202 on its outer or free end which has a generally conical shape and defines a rearwardly facing abutment surface 203. The locking element 196 is preferably made from flat spring metal and has two parallel and closely spaced legs 204, 204 joined together by a U-shaped connecting portion 206. A generally circular central opening 208 through the locking element 196 partially defined by each of the legs has a diameter slightly larger than the diameter of the head 202 to allow the head to pass freely therethrough. A longitudinally spaced series of generally circular overlapping openings 210, 210 are formed in the locking element immediately adjacent and communicating with the central opening 208. Each opening 210 is partially defined by each of the legs and has a diameter substantially equal to the diameter of the shank portion 200. A longitudinally extending slot 212 is formed in the locking element 196 near the connecting portion 206. Rivets 214, 214 serve to retain the locking element 196 in assembly with the lever 174, for longitudinal sliding movement relative thereto. One rivet 214 passes through the slot 212 and the other rivet passes through one of the openings 210. The locking element 196 is movable relative to the lever between a locking position indicated by full lines and a releasing position shown in broken lines in FIG. 16. In the locking position one of the openings 210 is generally coaxially aligned with the conical head 202 as the lever is pivoted toward the draw bar to bring the catch to its closed position. The head 202 cammingly engages the legs 204, 204 within an associated opening 194 to deflect the legs in opposite directions so that the locking element can snap over the head 202 and into general engagement with the shank 200. When the catch 170 is in its closed position the latter element is engageable with the abutment surface 203 to releasably retain the catch in its closed position. To open the catch the locking element 196 is moved longitudinally to its releasing position in which position the enlarged opening 208 is generally coaxially aligned with the head 202 so that the head may freely pass through the latter opening as the lever 174 is pivoted toward its open position. As previously noted the draw bar 176 is adjustable so that the locking stud 198 may take various positions with respect to the lever and it is for this reason that a plurality of locking apertures 210, 210 are provided for engaging the locking stud 198 in its various positions.

I claim:

1. A catch for releasably connecting two separable parts one of which carries a strike, said catch comprising a plurality of connected members including a base member adapted for attachment to the other of said parts in general alignment with said strike, a strike engaging member movable relative to said base member between an open position out of engagement with the strike and a closed position in engagement therewith, and an operating member providing connection between said base member and said strike engaging member for moving the latter member between its open and closed positions in response to the movement of said operating member between the open and a closed position respectively, an abutment surface associated with one of said members, and a one-piece locking element carried by another of said members and having a locking portion and a resilient portion for biasing said locking portion to a position wherein said locking portion is engagable with said abutment surface, said locking element including an operating portion adapted for manual manipulation for moving said locking portion from a locking position to a releasing position, said locking portion cooperating with said abutment surface in said locking position to retain said other member in a generally fixed position relative to said one member.

2. A catch as set forth in claim 1 wherein said locking element comprises a single piece of resilient wire.

3. A catch as set forth in claim 2 wherein said locking element comprises a single piece of resilient flat metal.

4. A catch as set forth in claim 1 including means for deflecting said locking portion from its locking position when said operating member is moved toward its closed position.

5. A catch as set forth in claim 4 wherein said means for deflecting said locking portion comprises a cam surface on said one member.

6. A catch as set forth in claim 4 wherein said other member has an opening therethrough and including a locking stud carried by said one member and defining said abutment surface, said locking stud projecting through said opening when said operating member is in said locking position and said locking portion is in said locking position, said locking stud comprising said means for deflecting said locking portion.

7. A catch as set forth in claim 1 wherein said one member comprises said base member and said other member comprises said operating member.

8. A catch as set forth in claim 1 wherein said one member comprises said operating member and said other member comprises said base member.

9. A catch as set forth in claim 1 wherein said one member comprises said strike engaging member and said other member comprises said operating member.

10. A catch as set forth in claim 9 wherein said locking portion is engageable with said abutment surface when said operating member is in an open position and said strike engaging member is in an open position to restrain said operating member against movement relative to said strike engaging member.

11. A catch for releasably connecting two separable parts one of which carries a strike, said catch comprising a plurality of connected members including a base member adapted for attachment to the other of said parts in general alignment with the strike, a strike engaging member movable relative to said base member between an open position and a closed position relative to the strike, and an operating member providing connection between said base member and said strike engaging member for moving the latter member between open and closed positions in response to movement of said operating member between an open position and a closed position respectively, an abutment surface associated with one of said members, a generally U-Shaped locking element having two spaced apart generally parallel legs extending in one direction and supported by another of said members for movement relative thereto between locking and releasing positions, at least one of said legs being biased to a position of engagement with said abutment surface when said locking element is in said locking position and said operating member is in said closed position to releasably retain said operating member in said closed position, and means for deflecting said one leg relative to the other of said legs and from its abutment engageable position when said operating member is moved toward its closed position to permit said operating member to be moved to its closed position when said locking element is in said locking position.

12. A catch as defined in claim 11 wherein said means for deflecting said one leg comprises a cam surface on said one member for engaging a portion of said one leg.

13. A catch as defined in claim 11 wherein said locking element is movable in said one and an opposite direction between said locking and releasing positions.

14. A catch as set forth in claim 11 wherein said other member is pivotally connected to said one member and said one direction is generally parallel to the axis of pivoted connection.

15. A catch as set forth in claim 11 wherein said other member is pivotally connected to said one member and said one direction is generally transverse of the axis of pivoted connection.

16. A catch as set forth in claim 11 wherein said locking element comprises a piece of resilient wire.

17. A catch as set forth in claim 11 wherein said locking element comprises a piece of resilient flat metal.

18. A catch as set forth in claim 11 including means for moving said locking element from said releasing position to said locking position in response to movement of said operating member to said closed position.

19. A catch as set forth in claim 18 wherein said means for moving said locking element from said releasing position to said locking position comprises a cam surface on said one member and another cam surface on said one leg for engaging said cam surface on said one member 20. A catch as set forth in claim 11 wherein said locking element has a cam surface thereon which cooperates with said deflecting means to hold said one leg out of engagement with said abutment surface when said operating member is in said closed position and said locking member is in said releasing position.

21. A catch as set forth in claim 20 wherein said locking element comprises a resilient piece of wire and said cam surface comprises a bent portion of one of said legs.

22. A catch for releasably connected two separable parts one of which carries a strike, said catch comprising a plurality of connected members including a base member adapted for attachment to the other of said parts in general alignment with the strike, a strike engaging member movable relative to said base member between an open position and a closed position relative to the strike, and an operating member connected to said base member to said strike engaging member for moving the latter member between its open and closed positions in response to movement of said operating member between an open position and a closed position respectively, means providing an abutment surface associated with one of said members, and a generally U-shaped locking element comprising a piece of resilient wire having two legs extending in one direction and supported by another of said members for movement relative thereto in said one and an opposite direction between locking and releasing positions, at least one of said legs having a portion thereof bent from said one direction, said bent portion being engageable with said abutment surface when said locking element is in said locking position and said operating member is in said closed position to releasably retain said operating member in said closed position.

* * * * *

75

UNITED STATES PATENT OFFICE
CERTIFICATE OF CORRECTION

Patent No. 3,670,371            Dated June 20, 1972

Inventor(s) Gunnar E. Swanson

It is certified that error appears in the above-identified patent and that said Letters Patent are hereby corrected as shown below:

```
Col. 2, line 48, after "has" insert --a--.
Col. 2, line 49, "strikes" should read --strike--.
Col. 3, line 28, "it" should read --its--.
Col. 3, line 36, "releasable" should read --releasably--.
Col. 4, line 3, "of" should read --or--.
Col. 4, line 62, "connection" should read --connecting--.
Col. 5, line 31, "of" should read --or--.
Col. 6, line 4, "to" should read --or--.
Col. 7, line 12, Claim 1, "the" should read --an--.
Col. 7, line 26, Claim 3, "2" should read --1--.
```

Signed and sealed this 2nd day of January 1973.

(SEAL)
Attest:

EDWARD M. FLETCHER, JR.
Attesting Officer

ROBERT GOTTSCHALK
Commissioner of Patents